US00RE40609E

(19) United States
(12) Reissued Patent
Shono

(10) Patent Number: US RE40,609 E
(45) **Date of Reissued Patent: *Dec. 23, 2008**

(54) DIGITAL CAMERA WITH MOVEABLE IMAGE PICKUP DEVICE

(75) Inventor: Tetsuji Shono, Saitama (JP)

(73) Assignee: Hoya Corporation, Tokyo (JP)

( * ) Notice: This patent is subject to a terminal disclaimer.

(21) Appl. No.: 10/815,193

(22) Filed: Apr. 1, 2004

Related U.S. Patent Documents

Reissue of:
(64) Patent No.: 6,366,323
Issued: Apr. 2, 2002
Appl. No.: 09/089,404
Filed: Jun. 3, 1998

(30) Foreign Application Priority Data

Jun. 12, 1997 (JP) ..... 9-155144

(51) Int. Cl.

| | |
|---|---|
| ***H04N 5/225*** | (2006.01) |
| ***H04N 5/232*** | (2006.01) |
| ***G02B 13/16*** | (2006.01) |
| ***G02B 7/10*** | (2006.01) |
| ***G03B 5/02*** | (2006.01) |
| ***G03B 17/04*** | (2006.01) |

(52) U.S. Cl. ..... 348/360; 348/335; 348/357; 348/340; 348/373; 348/374; 348/E5.025; 348/E5.027; 396/75; 396/349; 396/270

(58) Field of Classification Search ..... 348/208.11, 348/344, 308.99, 219.1, 240.99, 240.3, 262, 348/335, 340, 357, 360, 361, 369, 374; 396/75, 396/349, 350, 270, 361; 250/208.1
See application file for complete search history.

(56) References Cited

U.S. PATENT DOCUMENTS 3,377,427 A * 4/1968 Fischer ..... 348/366
4,451,129 A * 5/1984 Ikari et al. ..... 396/63

(Continued)

FOREIGN PATENT DOCUMENTS

| | | |
|---|---|---|
| DE | 3317999 | 11/1983 |
| DE | 9623066 | 12/1997 |

(Continued)

OTHER PUBLICATIONS

English language Abstract of JP6–308592.
English Language Abstract of JP 61–133933.
English language Abstract of JP 9–15682.
English Language Abstract of JP 58–10708.
English Language Abstract of JP 2003–207709.
English Language Abstract of JP 2002–277719.
English Language Abstract of JP 10–282394.
English Language Abstract of JP 58–162914.

*Primary Examiner*—John M Villecco
(74) *Attorney, Agent, or Firm*—Greenblum & Bernstein, P.L.C.

(57) ABSTRACT

A digital camera which includes: a photographic lens movable along an optical axis thereof between a retracted position and a photographing position in front of the retracted position; an image pick-up device on which an object image is formed through the photographic lens, the image pick-up device being guided to be movable between a first position where the image pick-up device is positioned in a photographic optical path of the photographic lens behind the photographic lens and a second position where the image pick-up device is positioned out of the photographic optical path; and a mechanism for moving the image pick-up device between the first position and the second position, wherein the moving mechanism moves the image pick-up device to the first position when the photographic lens is moved from the retracted position to the photographing position, and wherein the moving mechanism moves the image pick-up device to the second position when the photographic lens is moved from the photographing position to the retracted position

18 Claims, 3 Drawing Sheets

U.S. PATENT DOCUMENTS

| | | | | | |
|---|---|---|---|---|---|
| 4,525,050 | A | | 6/1985 | Ohashi | |
| 4,545,661 | A | | 10/1985 | Hamaguchi et al. | |
| 4,597,657 | A | * | 7/1986 | Wakabayashi | 396/75 |
| 4,643,554 | A | | 2/1987 | Ogawa | |
| 4,643,555 | A | | 2/1987 | Wakabayashi | |
| 4,721,972 | A | | 1/1988 | Wakabayashi | |
| 4,768,048 | A | * | 8/1988 | Wakabayashi | 396/75 |
| 4,771,303 | A | | 9/1988 | Matsumoto et al. | |
| 4,791,441 | A | * | 12/1988 | Nishi et al. | 396/75 |
| 4,792,822 | A | | 12/1988 | Akiyama et al. | |
| 4,803,557 | A | * | 2/1989 | Bridges | 358/229 |
| 4,841,323 | A | | 6/1989 | Yamada et al. | |
| 4,887,107 | A | | 12/1989 | Nakamura et al. | |
| 4,937,609 | A | | 6/1990 | Wakabayashi et al. | |
| 4,952,955 | A | | 8/1990 | Iwata et al. | |
| 4,961,115 | A | * | 10/1990 | Jessop | 358/229 |
| 4,974,949 | A | | 12/1990 | Tanaka | |
| 4,993,815 | A | | 2/1991 | Yamazaki et al. | |
| 5,086,312 | A | | 2/1992 | Tanaka et al. | |
| 5,099,263 | A | | 3/1992 | Matsumoto et al. | |
| 5,136,324 | A | | 8/1992 | Tsuboi et al. | |
| 5,210,644 | A | | 5/1993 | Nomura | |
| 5,223,873 | A | | 6/1993 | Tsuboi | |
| 5,264,939 | A | * | 11/1993 | Chang | 348/322 |
| 5,376,983 | A | | 12/1994 | Yamazaki et al. | |
| 5,430,516 | A | | 7/1995 | Uziie et al. | |
| 5,485,315 | A | | 1/1996 | Nomura et al. | |
| 5,499,143 | A | | 3/1996 | Sakamoto et al. | |
| 5,548,446 | A | | 8/1996 | Enomoto | |
| 5,557,327 | A | * | 9/1996 | Hasegawa et al. | 348/340 |
| 5,587,754 | A | | 12/1996 | Katayama et al. | |
| 5,636,062 | A | | 6/1997 | Okuyama et al. | |
| 5,706,051 | A | * | 1/1998 | Mogamiya | 348/335 |
| 5,715,482 | A | * | 2/1998 | Wakabayashi et al. | 396/79 |
| 5,731,913 | A | | 3/1998 | Imanari | |
| 5,739,962 | A | | 4/1998 | Asakura et al. | |
| 5,765,049 | A | | 6/1998 | Hase et al. | |
| 5,790,907 | A | | 8/1998 | Reibl | |
| 5,790,911 | A | | 8/1998 | Reibl | |
| 5,818,647 | A | | 10/1998 | Nishio et al. | |
| 5,832,326 | A | | 11/1998 | Tanaka | |
| 5,870,232 | A | | 2/1999 | Tsuji et al. | |
| 5,909,600 | A | | 6/1999 | Kosako | |
| 5,912,772 | A | | 6/1999 | Aoki | |
| 6,031,998 | A | | 2/2000 | Shono | |
| 6,052,535 | A | | 4/2000 | Uno | |
| 6,055,116 | A | | 4/2000 | Nomura et al. | |
| 6,064,533 | A | | 5/2000 | Kenin et al. | |
| 6,069,745 | A | | 5/2000 | Fujii et al. | |
| 6,075,655 | A | | 6/2000 | Funahashi | |
| 6,115,190 | A | | 9/2000 | Hirai | |
| 6,185,375 | B1 | | 2/2001 | Mikami | |
| 6,204,977 | B1 | | 3/2001 | Iwasa | |
| 6,324,019 | B1 | | 11/2001 | Takanashi et al. | |
| 6,366,323 | B1 | | 4/2002 | Shono | |
| 6,937,816 | B2 | * | 8/2005 | Endo et al. | 396/349 |
| 6,944,396 | B2 | * | 9/2005 | Ito et al. | 396/75 |
| 6,978,088 | B2 | * | 12/2005 | Nomura | 396/350 |
| 6,978,089 | B2 | * | 12/2005 | Nomura et al. | 396/75 |
| 6,990,291 | B2 | * | 1/2006 | Nomura | 396/73 |
| 7,013,081 | B2 | * | 3/2006 | Nomura et al. | 396/73 |
| 7,025,512 | B2 | * | 4/2006 | Nomura | 396/349 |
| 2001/0019458 | A1 | | 9/2001 | Nomura et al. | |
| 2001/0024573 | A1 | | 9/2001 | Nomura et al. | |
| 2002/0135896 | A1 | | 9/2002 | Nomura et al. | |
| 2002/0135900 | A1 | | 9/2002 | Nomura et al. | |
| 2002/0135901 | A1 | | 9/2002 | Nomura et al. | |
| 2003/0081325 | A1 | | 5/2003 | Nomura et al. | |
| 2003/0081327 | A1 | | 5/2003 | Nomura et al. | |
| 2003/0081948 | A1 | | 5/2003 | Nomura et al. | |
| 2003/0156832 | A1 | | 8/2003 | Nomura et al. | |
| 2004/0042089 | A1 | | 3/2004 | Nomura | |
| 2004/0042090 | A1 | | 3/2004 | Nomura | |
| 2004/0042091 | A1 | | 3/2004 | Nomura | |
| 2004/0042092 | A1 | | 3/2004 | Nomura | |
| 2004/0042093 | A1 | | 3/2004 | Nomura | |
| 2004/0042095 | A1 | | 3/2004 | Nomura | |
| 2004/0042096 | A1 | | 3/2004 | Nomura | |
| 2004/0042775 | A1 | | 3/2004 | Nomura | |
| 2004/0042776 | A1 | | 3/2004 | Nomura | |
| 2004/0042777 | A1 | | 3/2004 | Nomura | |
| 2004/0042778 | A1 | | 3/2004 | Nomura | |
| 2004/0051967 | A1 | | 3/2004 | Nomura | |
| 2004/0051968 | A1 | | 3/2004 | Nomura | |
| 2004/0051969 | A1 | | 3/2004 | Nomura | |
| 2004/0051970 | A1 | | 3/2004 | Nomura | |
| 2004/0051971 | A1 | | 3/2004 | Nomura | |
| 2004/0051972 | A1 | | 3/2004 | Nomura | |
| 2004/0051981 | A1 | | 3/2004 | Nomura | |
| 2004/0062536 | A1 | | 4/2004 | Nomura | |
| 2004/0062537 | A1 | | 4/2004 | Nomura | |
| 2004/0141735 | A1 | | 7/2004 | Nomura | |
| 2004/0151490 | A1 | * | 8/2004 | Nomura | 396/349 |
| 2005/0002665 | A1 | * | 1/2005 | Ito et al. | 396/349 |
| 2005/0151875 | A1 | * | 7/2005 | Idemura | 348/360 |
| 2005/0185297 | A1 | * | 8/2005 | Omiya et al. | 359/704 |
| 2005/0185950 | A1 | * | 8/2005 | Omiya et al. | 396/349 |
| 2005/0207748 | A1 | * | 9/2005 | Ishizuka et al. | 396/349 |
| 2005/0254140 | A1 | * | 11/2005 | Sakamoto | 359/695 |
| 2005/0280903 | A1 | * | 12/2005 | Oshima et al. | 359/697 |
| 2006/0034604 | A1 | * | 2/2006 | Nomura et al. | 396/349 |
| 2006/0045516 | A1 | * | 3/2006 | Ishizuka et al. | 396/349 |
| 2006/0045517 | A1 | * | 3/2006 | Kato et al. | 396/349 |

FOREIGN PATENT DOCUMENTS

| | | | | |
|---|---|---|---|---|
| EP | 000549300 | A1 | * | 6/1993 |
| EP | 0598703 | | | 5/1994 |
| EP | 0634680 | | | 1/1995 |
| EP | 0810466 | | | 12/1997 |
| GB | 2261298 | | | 5/1993 |
| GB | 2262356 | | | 6/1993 |
| GB | 2309551 | | | 7/1997 |
| GB | 2344661 | | | 6/2000 |
| GB | 2344662 | | | 6/2000 |
| GB | 2394787 | | | 5/2004 |
| JP | 2003-114473 | | | 4/1803 |
| JP | 58-10708 | | | 1/1983 |
| JP | 58-145930 | | | 8/1983 |
| JP | 58-162914 | | | 9/1983 |
| JP | 61-69002 | | | 4/1986 |
| JP | 61-133933 | | | 6/1986 |
| JP | 61-270737 | | | 12/1986 |
| JP | 63-149629 | | | 6/1988 |
| JP | 64-34623 | | | 3/1989 |
| JP | 5-313226 | | | 11/1993 |
| JP | 6-18777 | | | 1/1994 |
| JP | 06230263 | A | * | 8/1994 |
| JP | 406230263 | A | * | 8/1994 |
| JP | 06303497 | A | * | 10/1994 |
| JP | 406303497 | A | * | 10/1994 |
| JP | 6-308592 | | | 11/1994 |
| JP | 08009230 | A | * | 1/1995 |
| JP | 7-191249 | | | 7/1995 |
| JP | 7-199019 | | | 8/1995 |
| JP | 7-288724 | | | 10/1995 |
| JP | 7-295050 | | | 11/1995 |
| JP | 08009230 | A | * | 1/1996 |
| JP | 008126750 | A | * | 7/1996 |
| JP | 08186759 | A | * | 7/1996 |
| JP | 08237529 | A | * | 9/1996 |
| JP | 008237529 | A | * | 9/1996 |

| | | | | |
|---|---|---|---|---|
| JP | 08313790 | A | * | 11/1996 |
| JP | 09-5849 | | | 1/1997 |
| JP | 9-15682 | | | 1/1997 |
| JP | 10-32740 | | | 2/1998 |
| JP | 10254054 | A | * | 9/1998 |
| JP | 10-282394 | | | 10/1998 |
| JP | 11-109203 | | | 4/1999 |
| JP | 2000-023002 | | | 1/2000 |
| JP | 2002-277719 | | | 9/2002 |
| JP | 2003149723 | A | * | 5/2003 |
| JP | 2003-207709 | | | 7/2003 |
| JP | 2004-257555 | | | 9/2004 |

* cited by examiner

DIGITAL CAMERA WITH MOVEABLE IMAGE PICKUP DEVICE

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,366,323. The reissue applications are application Ser. Nos. 10/815,193 (the present application) and 10/815,194, both filed on Apr. 1, 2004 and both of which are reissues of U.S. Pat. No. 6,366,323.*

BACKGROUND OF THE INVENTION

1. Field of the Invention

The present invention relates to a digital camera provided with an image pick-up device such as a CCD for converting an image of an object into electric signals.

2. Description of the Related Art

A digital camera (digital imaging camera) generally includes an image pick-up device such as a CCD (charge-coupled device) for converting an object image formed thereon through the photographic lens of the camera into electric signals which are then converted into digital signals. The digital signals are generally stored in a recording medium such as a flash memory or a memory card in a predetermined format.

In a conventional digital camera, it is difficult to reduce the thickness of the camera body because a bulky image pick-up device is positioned in the camera body behind the photographic lens. Even if the camera is designed to have a retractable photographic lens for the purpose of reducing the thickness of the camera body when the camera is not in use, it is still difficult to reduce the thickness because a sufficient space in which the photographic lens is to retract cannot be secured in front of the bulky image pick-up device within a this camera body.

SUMMARY OF THE INVENTION

It is an object of the present invention to provide a digital camera having structure which makes it possible to design the camera body to be thin in the direction of the optical axis of the photographic lens of the camera.

To achieve the object mentioned above, according to an aspect of the present invention, there is provided a digital camera which includes: a photographic lens movable along an optical axis thereof between a retracted position and a photographing position in front of the retracted position; an image pick-up device on which an object image is formed through the photographic lens, the image pick-up device being guided to be movable between a first position where the image pick-up device is positioned in a photographic optical path of the photographic lens behind the photographic lens and a second position where the image pick-up device is positioned out of the photographic optical path; and a mechanism for moving the image pick-up device between the first position and the second position, wherein the moving mechanism moves the image pick-up device to the first position when the photographic lens is moved from the retracted position to the photographing position, and wherein the moving mechanism moves the image pick-up device to the second position when the photographic lens is moved from the photographing position to the retracted position.

Preferably, the image pick-up device is guided in a direction perpendicular to the optical axis.

Preferably, the moving mechanism moves the image pick-up device from the first position to the second position before the photographic lens reaches the retracted position.

According to another aspect of the present invention, there is provided a digital camera having a retractable photographic lens. The digital camera includes: an image pick-up device on which an object image is focused through the photographic lens; and a mechanism for positioning the image pick-up device in a photographic optical path of the photographic lens behind the photographic lens when a power switch of the digital camera is turned ON, and for positioning the image pick-up device out of the photographic optical path when the power switch is turned OFF.

The present disclosure relates to subject matter contained in Japanese Patent Application No. 09-155144 (filed on Jun. 12, 1997) which is expressly incorporated herein by reference in its entirety.

BRIEF DESCRIPTION OF THE DRAWINGS

The present invention will be described below in detail with reference to the accompanying drawings in which.

DETAILED DESCRIPTION OF THE PREFERRED EMBODIMENTS

Figure 1A:
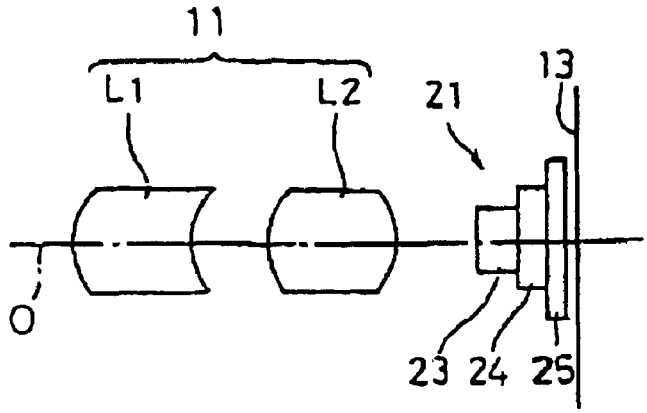
FIGS. 1A, 1B and 1C are schematic sectional views of a photographic optical system and an image pick-up unit in different positions, showing a fundamental structure of a digital camera in which the present invention is applied.
Figure 1B:
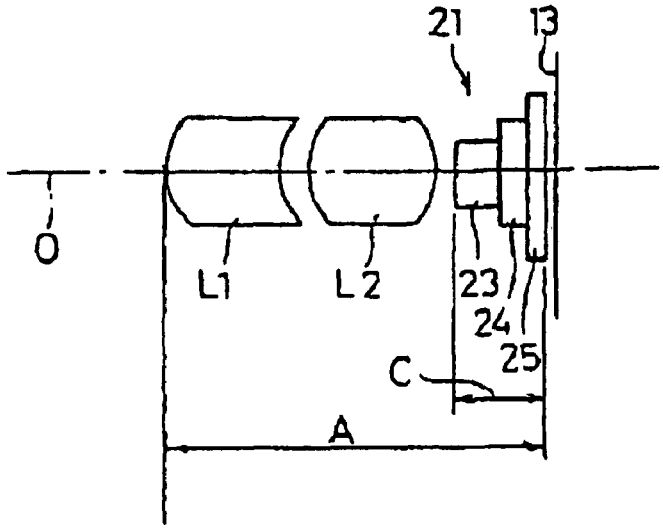
Figure 1C:
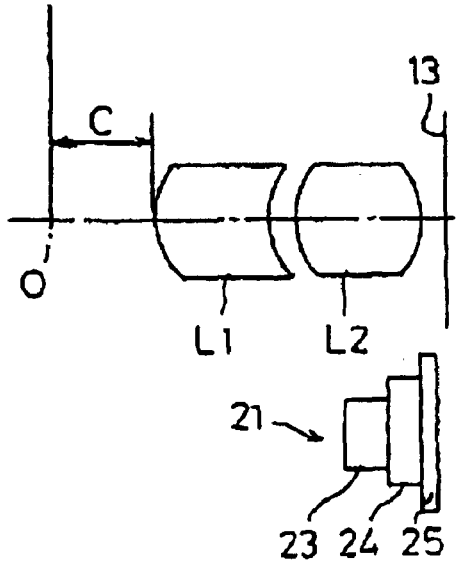

FIGS. 1A, 1B and 1C show a fundamental structure of a digital camera to which the present invention is applied. The camera is provided with a zoom lens 11 consisting of two lens groups, i e, a front lens group L1 and a rear lens group L2. The front and rear lens groups L1 and L2 are moved along an optical axis O of the zoom lens 11 while varying the distance therebetween in effect zooming and focusing.

The camera is provided with an image pick-up unit (image pick-up device) 21. The image pick-up unit 21 is provided with a base plate 25 to which a CCD 24 is fixed. A set of filters 23 including a low-pass filter and an infrared filter are secured to the CCD 24 between the rear lens group L2 and the CCD 24. The base plate 25 is guided in a direction perpendicular to the optical axis O to be selectively movable between a first position where the CCD 24 is positioned behind the rear lens group L2 (see FIG. 1A or 1B) and a second position where the CCD 24 is positioned out of the photographic optical path of the zoom lens 11 (see FIG. 1C). The base plate 25 is moved between the first and second positions by a drive mechanism (not shown in any of FIGS. 1A, 1B and 1C). In each of FIGS. 1A, 1B and 1C reference numeral 13 designates an inner surface of a wall (e g, a back wall) of a camera body of the camera.

FIG. 1A shows the zoom lens 11 and the image pick-up unit 21 in a photo-ready condition with the power switch of the camera turned ON. FIG. 1B shows the zoom lens 11 and the image pick-up unit 21 in a non-photographable condition with the zoom lens 11 retracted and with the image pick-up unit 21 still positioned behind the rear lens group L2. FIG. 1C shows the zoom lens 11 and the image pick-up unit 21 in a non-photographable condition with the zoom lens 11 retracted and with the image pick-up unit 21 positioned out of the photographic optical path of the zoom lens 11. In the photo-ready condition shown in FIG. 1A, the front and rear lens groups L1 and L2 are each advanced forwardly with the rear lens group L2 being sufficiently apart from the image pick-up unit 21, and the front and rear lens groups L1 and L2 are adjusted by a focusing device (not shown) to form a sharp object image on the light receiving surface of the CCD 24. The camera is provided therein with an image processing circuit (not shown). The electric image signals output from the CCD 24 are transmitted to the image processing circuit via a cable (not shown) to be converted by the image processing circuit into digital data in a predetermined format. The digital data is stored in a recording medium such as a flash memory or a memory card, or is output from the camera.

When the power switch is turned off, the front and rear lens groups L1 and L2 are retracted to respective rearmost positions (retracted positions) and at the same time the image pick-up device 21 is moved out of the photographic optical path of the zoom lens 11, as shown in FIG. 1C to the case where the zoom lens 11 is retracted with the image pick-up device 21 still positioned behind the rear lens group L2 in the photographic optical path of the zoom lens 11, the rear lens group L2 cannot be moved back beyond the position of the front end of the image pick-up device 21, namely, the rear lens group L2 cannot retreat to a position where it contacts the filter set 23. FIG. 1B shows a state where the front and rear lens groups L1 and L2 are retracted with the image pick-up device 21 remained to be positioned behind the rear lens group L2. In the state shown in FIG. 1B, "A" designates a distance between the front end of the front lens group L1 and the back surface of the base plate 25. In FIG. 1B "C" designates the thickness of the image pick-up unit 21. The thickness C is approximately 7 to 8 mm.

In the digital camera to which the present invention is applied, the image pick-up unit 21, which includes the CCD 24, is moved out of the photographic optical path of the zoom lens 11 in the direction perpendicular to the optical axis O when the zoom lens 11 is retracted, which makes it possible to further retract the zoom lens 11 in the camera body. Therefore, it is possible to retract the zoom lens 11 to a position where the rear end of the rear lens group L2 almost contacts the inner surface 13 of the camera body. That is, if the image pick-up unit 21 is moved off the photographic optical path, the zoom lens 11 can further retreat by a length corresponding to thickness C of the image pick-up unit 21. It is therefore possible to thin the camera body by thickness C (see FIG. 1C). It is otherwise possible to lengthen a lens barrel for supporting the zoom lens 11 by thickness C, which makes it possible to provide the camera body with a zoom lens having a longer focal length or a higher zoom ratio.

The image pick-up unit 21 may be moved into and out of the photographic optical path by any drive mechanism.

The zoom lens 11 and the image pick-up unit 21 may be moved by a common motive power source or by different motive power sources.

Figure 2:
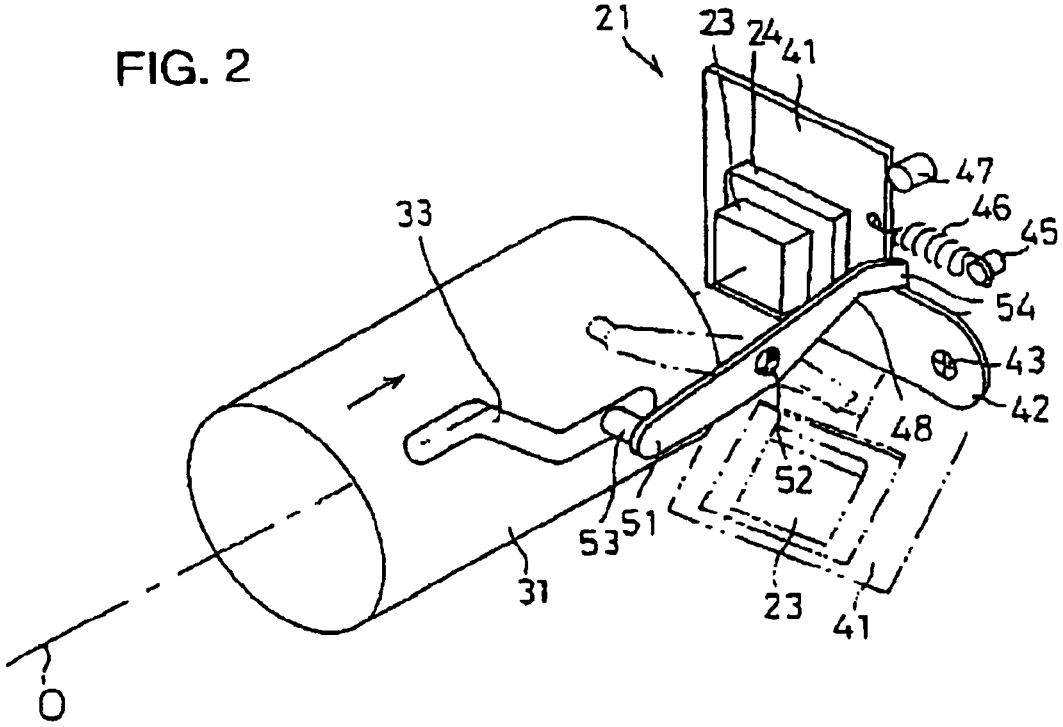
FIG. 2 is a perspective view of fundamental of a first embodiment of the digital camera to which the present invention is applied.

FIG. 2 shows fundamental elements of a first embodiment of the digital camera to which the present invention is applied. This first embodiment is characterized in that the image pick-up unit 21 is inserted into and taken out of the photographic optical path by the linear movement of a movable lens barrel 31. The image pick-up unit 21 is in the photographic optical path behind the zoom lens 11 as shown by solid lines in FIG. 2 when the lens barrel 31 is positioned in an advanced position (photographing position). The image pick-up unit 21 is moved out of the photographic optical path behind the zoom lens 11 as shown by two-dot chain lines in FIG. 2 when the lens barrel 31 retreats into the camera body.

The image pick-up unit 21 is secured to a support plate 41 having a leg portion 42. The leg portion 42 is pivoted about a shaft 43 which extends in parallel to the optical axis O. The shaft 43 is fixed to the camera body (not shown in FIG. 2).

A tension spring 46 extends between the support plate 41 and a pin 45 which is fixed to the camera body. The spring 46 urges the plate 41 in one direction around the shaft 43 (clockwise direction as viewed in FIG. 2). The urged plate 41 is stopped by a locating pin 47 fixed to the camera body to position the image pick-up unit 21 in the photographing position. When the image pick-up unit 21 is in this position, an object image is formed on the light receiving surface of the image pick-up unit 21 through the zoom lens 11. The image pick-up unit 21 is moved out of the photographic optical path including the optical axis O when the support plate 41 is rotated about the shaft 43 counterclockwise as viewed in FIG. 2 against the spring force of the spring 46.

A link bar 51 is positioned nearby the lens barrel 31. A central portion of the link bar 51 is pivoted about a shaft 52 extending perpendicularly to the optical axis O. The shaft 52 is secured to the camera body. The link bar 51 is provided at the front end thereof with a follower pin 53. The lens barrel 31 is provided with a cam groove 33 in which the follower pin 53 is fitted. The other end 48 of the link bar 51 is bunt to have an engaging portion 54 which is engaged with an upper edge of the leg portion 42 of the support plate 41. When the link bar 51 rotates clockwise as viewed in FIG. 2, the support plate 41 is rotated counterclockwise about the shaft 43 by the rotational movement of the link bar 51 to be positioned in a retracted position (shown by two-dot chain lines in FIG. 2) against the spring force of the spring 46.

Figure 3:
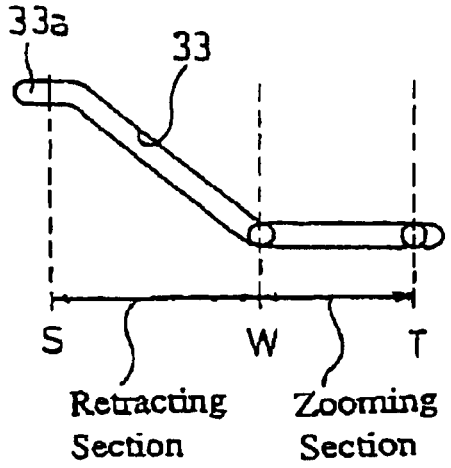
FIG. 3 is a plan view of a cam groove formed on a cam ring shown in FIG. 2.

FIG. 3 shows the contour of the cam groove 33. The cam groove 33 includes a zooming section between T and W which extends in parallel with the optical axis O. The lens barrel 31 is moved linearly, without rotating about the optical axis O. When the lens barrel 31 is moved linearly to effect zooming, the follower pin 53 is fitted in the cam groove 33 within the zooming section between T and W. This maintains the link bar 51 in the position (shown by solid lines in FIG. 2) where the bar 51 does not the support plate 41 from its photographing position to retracted position. The cam groove 33 also includes a retracting section between W and S which extends inclined to the optical axis O and the zooming section between T and W. When the lens barrel 31 is retracted upon the power switch being turned OFF, the cam pin 53 moves from the zooming section between T and W to the end 33a of the retracting section between W and S, which turns the link bar 51 to the retracted position shown by two-dot chain lines in FIG. 2.

Figure 4:
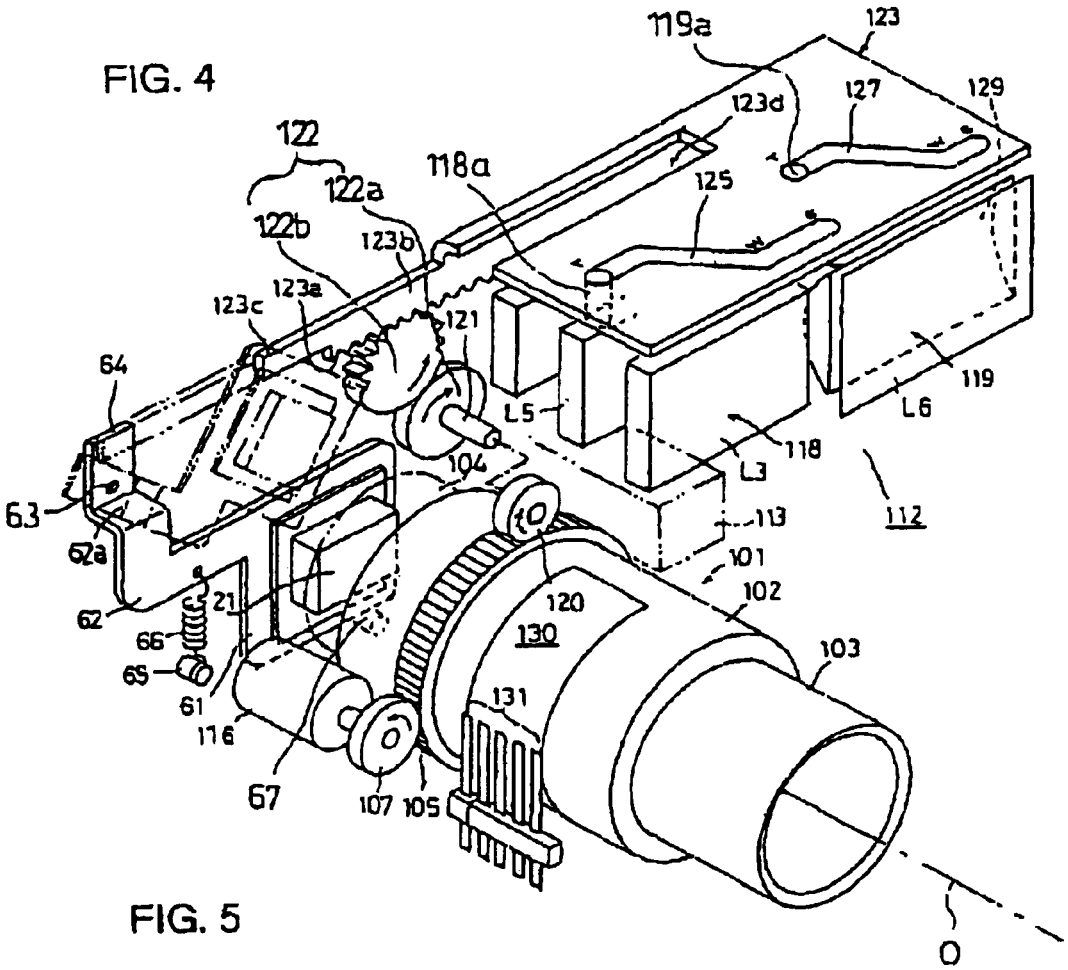
FIG. 4 is a perspective view of fundamental elements of a second embodiment of the digital camera to which the present invention is applied.
Figure 5:
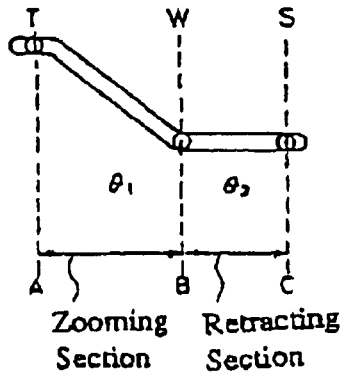
FIG. 5 is a plan view of a cam slot formed on a cam plate shown in FIG. 4.

FIG. 4 shows fundamental elements of a second embodiment of the digital camera to which the present invention is applied. The digital camera is provided with a motor-driven zoom lens, the basic structure of which is disclosed in, e g, Japanese Laid-Open Patent Publication 62-285632. The camera is provided with a zoom lens barrel block 101, a finder and strobe block 112, a distance measuring device, and a zoom motor 116. The distance measuring device includes a set of light emitter and receiver 113. Those components 101, 112, 113 and 116 are supported by or mounted on the camera body.

The barrel block 101 is provided with a cam ring 102, a front barrel 103 and a rear barrel 104. Each of the barrels 103 and 104 is fitted in the cam ring 102 and is moved forwardly and rearwardly by the rotation of the cam ring 102. The barrels 103 and 104 support front and rear lens groups L1 and L2 (not shown in FIG. 4) thereinside, respectively. Each barrel can be moved between a retracted position and a photographing position. Each barrel is moved within a zooming range including the photographing position as the cam ring 102 rotates.

The finder and strobe block 112 is provided with a zoom finder 118 and a strobe 119. In accordance with the variation in the focal length of the zoom lens 11, the finder 118 changes its magnification and field of view while the strobe 119 changes its angle of illumination.

The cam ring 102 is provided on an outer periphery thereof with a sector gear 105 which extends along the circumference of the cam ring 102. The sector gear 105 meshes with a drive pinion 107 which is fixed to the drive shaft of the zoom motor 116. The sector gear 105 also meshes with a driven pinion 120 which is fixed to the front end of a shaft 121 which extends in parallel to the optical axis O. The shaft 121 is provided at the rear end thereof with a first gear 122a. This first gear 122a meshes with a second gear 122b which meshes with a rack 123a formed on a cam plate 123. The first and second gears 122a and 122b constitute a reduction gear train 122 for transmitting rotation of the cam ring 102 to the rack 123a while lowering the output speed. Accordingly, the rotation of the cam ring 102 is transmitted to the cam plate 123 through the sector gear 105, the driven pinion 120, the shaft 121, the reduction gear train 122 and the rack 123a. The rotational position (angular position) of the ring 102 is detected through a code plate 130 secured to the outer periphery of the ring 102 and conductive brushes 131 slidably contacting the code plate 130.

The cam plate 123 is guided horizontally in a direction perpendicular to the optical axis O of the zoom lens. The cam plate 123 is provided along a rear end thereof with a downwardly extending bent portion 123b. The aforementioned rack 123a, which meshes with the second gear 122b, is formed on the bottom end of the bent portion 123b therealong. The cam plate 123 is provided with a first cam slot 125 for varying the magnification of the finder 118 and a second cam slot 127 for varying the angle of illumination of the strobe 119.

The finder optical system of the finder 118 consists of three lens groups, i e, a fixed object lens group L3, a fixed eyepiece lens group L4 and a movable lens group L5 positioned between the object lens group L3 and the eyepiece lens group L4. The magnification of the finder 118 varies by moving the movable lens group L5 along the optical axis of the finder 118. The movable lens group L5 is provided with a follower pin 118a which is fitted in the first cam slot 125. The movable lens group L5 is moved to vary the magnification of the finder 118 such that the field of view of the finder 118 is coincident with the size of a picture which is varied due to the variation of the focal length of the zoom lens in the barrel block 101.

As the focal length of the zoom lens becomes longer, the strobe 119 narrows the angle of illumination. For a close shot, the strobe 119 widens the angle of illumination, reducing the illuminance level on an object which is to be photographed. For this, the strobe 119 is provided with a fixed Fresnel lens L6 and a reflector 129 which holds a xenon lamp (not shown). The reflector 129 is provided with a follower pin 119a which is fitted in the second cam slot 127 so as to be driven to move along its optical axis by the movement of the cam plate 123.

The turning of the cam ring 102 causes the cam plate 123 to move right and left. When the zoom lens 11 is retracted, i e., when the front and rear barrels 103 and 104 are retracted, the cam plate 123 is positioned in its position closest to the barrel block 101. When the zoom lens 11 is positioned within the photographing range, that is, within the zooming range, the cam plate 123 is away from the barrel block 101. This second embodiment is characterized in that the image pick-up unit 21 is moved between the photographing position and the retracted position by the movement of the cam plate 123.

The contour of each of the first and second cam slots 125 and 127 is determined in association with the rotational position (angular position) of the cam ring 102. Namely, the contour of each cam slot is determined such that points T, W and S of each cam slot correspond to a telephoto-extremity angular position A, a wide-angle-extremely angular position D and a retracted angular position C of the cam ring 102, respectively. The section of each cam slot between the points T and W is determined to correspond to the angle of rotation of the cam ring 102 between the angular positions A and B. Likewise, the section of each cam slot between the points W and S is determined to correspond to the angle of rotation of the cam ring 102 between the angular positions B and C. The sections between the points T and W of the first and second cam slots 125 and 127 are each inclined relative to the direction of movement of the cam plate 123 so as to vary the magnification of the finder 118 and the angle of illumination of the strobe 119, respectively, in accordance with the variation of the focal length of the zoom lens 11. The retracting sections between the points W and S of the first and second cam slots 125 and 127 are each parallel with the direction of movement of the cam plate 123, so that neither the magnification of the finder 118 nor the angle of illumination of the strobe 119 varies as long as the follower pins 118a and 119a move within the sections between W and S of the cam slots 125 and 127, respectively. Rotation of the cam ring 102 between its angular positions B and C, which respectively correspond to the points W and S, causes the image pick-up unit 21 to move between the photographing position (shown by solid lines in FIG. 4) and the retracted position (shown by two-dot chain lines in FIG. 4).

The image pick-up unit 21 is secured to a support plate 61 which lies in a plane perpendicular to the optical axis O of the zoom lens 11. The support plate 61 is provided with an L-shaped leg portion 62. An end of the leg portion 62 is bent rearwards and further bent upwards to form a crank portion 62a having an L-shape cross section. The crank portion 62a is pivoted about a shaft 63 which extends in parallel with the optical axis O. The shaft 63 is fixed to the camera body (not shown).

A tension spring 66 extends between the support plate 61 and a pin 65 which is fixed to the camera body. The support plate 61 is urged in one direction by the spring 66 and stopped by a locating pin 67 fixed to the camera body to position the image pick-up unit 21 in the photographing position. When the image pick-up unit 21 is in the photographing position, an object image is formed on the light receiving surface of the image pick-unit 21 through the zoom lens 11. The support plate 61 can be rotated about the shaft 63 against the spring force of the spring 66 to move the image pick-up unit 21 out of the photographic optical path including the optical axis O.

The bent portion 123b of the cam plate 123, which is provided with the rack 123a, is provided at one end thereof closer to the image pick-up unit 21 with a pusher 123c, which is formed as an extension of the bent portion 123b. Rotation of the zoom motor 116 in the direction to retract the zoom lens 11 causes the cam plate 123 to move toward the retracted position (to the left as viewed in FIG. 4), which causes the tip of the pusher 123c contact and pushes the upper end 64 of the crank portion 62a of the support plate 61. This turns the support plate 61 towards its retracted position against the spring force of the spring 66. Before the cam plate 123 reaches its retracted position, the image pick-up unit 21 is moved off the photographing optical path as shown by two-dot chain lines in FIG. 4. The cam plate 123 is provided with a slit 123d in which part of the image pick-up unit 21 can move so as not to interfere with the cam plate 123 when it moves to its retracted position.

Rotation of the zoom motor 116 in the retracting direction causes the rear barrel 104 and the rear lens group L2 to retreat towards their retracted positions previously occupied by the image pick-up unit 21 (refer to FIG. 1C).

Rotation of the zoom motor 116 in the advancing direction causes the rear barrel 104 and the rear lends group L2 to move forwardly, which causes the cam plate 123 to move towards the telephoto extremity position thereof, i e, in a direction apart from the barrel block 101. The movement of the cam plate 123 in this direction moves the pusher 123c away from the upper end 64 of the crank portion 62a of the support plate 61. This causes the support plate 61 to turn towards its photographing position through the spring force of the spring 66. Further movement of the cam plate 123 causes the image pick-up unit 21 to move into the photographic optical path, where the rear barrel 104 and the rear lens group L2 are already absent. When the cam plate 123 reaches its wide-angle extremity position, the pusher 123c leaves the upper end 64 of the crank portion 62a. Consequently, the spring 66 brings the support plate 61 into contact with the locating pin 67. While the zoom lens 11 is driven to effect zooming and focusing, the cam plate 123 moves within a range where its pusher 123c is apart from the upper end 64 of the crank portion 62a, so that the image pick-up unit 21 remains in the photographing position, where the spring 66 holds the support plate 61 to contact the locating pin 67.

After the power switch (not shown) of the camera shown in FIG. 4 is turned off, the zoom motor 116 rotates in the retracting direction to retract the lens barrels 103 and 104. At the same time, the cam plate 123 slides in the retracting direction. This first turns the support plate 61 toward its retracted position to move the image pick-up unit 21 out of the photographing optical path. After the image pick-up unit 21 moves off the photographing optical path, the rear barrel 104 moves into the position previously occupied by the image pick-up unit 21. Consequently, the rear end of the rear barrel 104 or the rear lens group L2 moves rearwardly to a position close to the inner surface 13 of the camera body (see FIG. 1 (C)).

As can be understood from the foregoing, according to the digital camera to which the present invention is applied, when the photographic lens retreats in the camera body, the image pick-up unit 21, which is positioned behind the photographic lens, is moved out of the photographic optical path to secure the space behind the lens in which the rear end of the photographic lens can further retreat. It is therefore possible to reduce the thickness of the camera body, or lengthen the movable lens barrel in order to increase the zoom ratio.

In each of the first and second embodiments, although the image pick-up unit 21 is secured to the support plate (41 or 61) which is pivoted about the shaft (43 or 63) extending parallel to the optical axis O so as to move the image pick-up unit 21 into and out of the photographic optical path, the image pick-up unit 21 can be guided in a direction perpendicular to the optical axis so as to be driven to linearly move into and out of the photographic optical path.

In each of the first and second embodiments, the zoom lens 11 and the image pick-up unit 21 can be driven by different motive power sources.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

[1. A digital camera comprising:

a photographic lens movable along an optical axis thereof between a retracted position and a photographing position in front of said retracted position;

image pick-up device on which an object image is formed through said photographic lens, said image pick-up device being guided to be movable between a first position where said image pick-up device is positioned in a photographic optical path of said photographic lens behind said photographic lens and a second position where said image pick-up device is positioned out of said lens optical path; and a mechanism for moving said image pick-up device between said first position and said second position, wherein said moving mechanism moves said image pick-up device to said first position when said photographic lens is moved from said retracted position to said photographing position, and wherein said moving mechanism moves said image pick-up device to said second position when said photographic lens is moved from said photographing position to said retracted position.]

[2. The digital camera according to claim 1, wherein said image pick-up device is guided in a direction perpendicular to said optical axis.]

[3. The digital camera according to claim 1, wherein said moving mechanism moves said image pick-up device from said first position to said second position before said photographic lens reaches said retracted position.]

[4. The digital camera according to claim 3, wherein a rear end of said photographic lens moves into a space previously occupied by said image pick-up device when said photographic lens moves from said photographing position to L1 said retracted position.]

[5. The digital camera according to claim 1, wherein said moving mechanism comprises a support plate to which the image pick-up device is secured, said support plate being pivoted about a shaft secured to a body of said digital camera so that said image pick-up device is movable between said first position and said second position.]

[6. The digital camera according to claim 5, wherein said shaft extends parallel to said optical axis.]

[7. The digital camera according to claim 1, wherein said photographic lens comprises:

a lens barrel movable along said optical axis between said retracted position and said photographing position; and a photographic optical system comprising a front lens group and a rear lens group, at least said rear lens group being supported by said movable lens barrel;

wherein said moving mechanism further comprises an interlocking mechanism, provided between said image pick-up device and said movable lens barrel, for moving said image pick-up device between said first position and said second position in association with the movement of said movable lens barrel between said photographing position and said retracted position.]

[8. The digital camera according to claim 5, wherein said moving mechanism further comprises a spring for continuously urging said support plate in a direction to move said image pick-up device to said first position.]

[9. The digital camera according to claim 5, wherein said photographic lens is a motor-driven zoom lens, said moving mechanism further comprises:

a cam plate guided in a direction perpendicular to the optical axis, said cam plate being moved in association with the movement of said photographic lens; and an interlocking mechanism, provided between said image pick-up device and said cam plate, for moving said image pick-up device between said first position and said second position in association with the movement of said cam plate.]

[10. The digital camera according to claim 9, further comprising:

a zoom finder which varies a magnification thereof in association of the variation of a focal length of said photographic lens, said zoom finder comprising at least one movable lens group having a follower, wherein said cam plate comprises a cam slot in which said follower is fitted.]

[11. The digital camera according to claim 10, further comprising:

a strobe which varies an angle of illumination thereof in association of said variation of said focal length of said photographic lens, said strobe comprising a movable light emitting unit having a second follower, wherein said cam plate comprises a second cam slot in which said second follower is fitted.]

[12. The digital camera according to claim 7, wherein said moving mechanism further comprises a support plate to which the image pick-up device is secured, said support plate being pivoted about a shaft secured to a body of said digital camera so that said image pick-up device is movable between said first position and said second position, wherein said interlocking mechanism comprises:

a link bar pivoted about a shaft secured to said camera body, one end of said link bar having a follower, the other end of said link bar engaging with said support plate; and a cam groove formed on said movable lens barrel, said follower being fitted in said cam groove.]

[13. A digital camera having a retractable photographic lens, comprising:

an image pick-up device on which an object image is focused through said lens photographic; and a mechanism for positioning said image pick-up in a photographic optical path of said photographic lens behind said photographic lens when a power switch of said digital camera is turned ON, and for positioning said image pick-up device out of said photographic optical path when said power switch is turned OFF.]

*14. A method for operating a camera having a barrel and a plurality of optical elements, the method comprising:*

*moving the barrel along an optical axis between and including a plurality of photographic positions and at least one position in which no photograph can be taken;*

*positioning all of the optical elements along the optical axis when the barrel is in all of the plurality of photographic positions; and*

*positioning at least one optical element of the plurality of optical elements out of the optical axis and at least another optical element of the plurality of optical elements along the optical axis, such that at least a portion of the at least one optical element and at least a portion of the at least another optical element are located along a common plane which is generally perpendicular to the optical axis, when the barrel is in the at least one position in which no photograph can be taken.*

*15. The method according to claim 14, wherein the at least one optical element is an image pick-up device.*

*16. The method according to claim 15, wherein the image pick-up device is a charge-coupled device.*

*17. The method according to claim 14 wherein the plurality of optical elements includes at least one lens and an image pick-up device.*

*18. The method according to claim 17, wherein the image pick-up device is a charge-coupled device.*

*19. The method according to claim 14, wherein the plurality of optical elements includes an image pick-up device and a plurality of lenses.*

*20. The method according to claim 19, wherein the image pick-up device is a charge-coupled device.*

*21. The method according to claim 14, further comprising moving a finder in association with movement of the barrel within the plurality of photographic positions.*

*22. The method according to claim 14, wherein the plurality of photographic positions comprises a zoom range.*

*23. A method for operating a camera having a barrel and a plurality of imaging elements, the method comprising:*

*moving the barrel along an optical axis between and including a plurality of photographic positions and at least one position in which no photograph can be taken;*

*positioning all of the imaging elements along the optical axis when the barrel is in all of the plurality of photographic positions; and*

*positioning at least one imaging element of the plurality of imaging elements out of the optical axis and at least another imaging element of the plurality of imaging elements along the optical axis, such that at least a portion of the at least one imaging element and at least a portion of the at least another imaging element are located along a common plane which is generally perpendicular to the optical axis, when the barrel is in the at least one position in which no photograph can be taken.*

*24. The method according to claim 23, wherein the at least one imaging element is an image pick-up device.*

*25. The method according to claim 24, wherein the image pick-up device is a charge-coupled device.*

*26. The method according to claim 23, wherein the plurality of imaging elements includes at least one lens and an image pick-up device.*

*27. The method according to claim 26, wherein the image pick-up device is a charge-coupled device.*

*28. The method according to claim 23, wherein the plurality of imaging elements includes an image pick-up device and a plurality of lenses.*

*29. The method according to claim 28, wherein the image pick-up device is a charge-coupled device.*

*30. The method according to claim 23, further comprising moving a finder in association with movement of the barrel within the plurality of photographic positions.*

*31. The method according to claim 23, wherein the plurality of photographic positions comprises a zoom range.*

* * * * *